United States Patent
Kumar et al.

(10) Patent No.: US 12,120,392 B2
(45) Date of Patent: *Oct. 15, 2024

(54) METHOD, APPARATUS AND SYSTEM FOR REALIZING DYNAMIC SCHEDULING FOR A CINEMA AND CONTROLLING PLAYING OF A MOVIE

(71) Applicant: GOGOCINEMA INTERNATIONAL FZ-LLC, Dubai (AE)

(72) Inventors: Pranay Kumar, North Point (HK); Man Nang Chong, North Point (HK)

(73) Assignee: GOGOCINEMA INTERNATIONAL FZ-LLC, Dubai (AE)

( * ) Notice: Subject to any disclaimer, the term of this patent is extended or adjusted under 35 U.S.C. 154(b) by 63 days.

This patent is subject to a terminal disclaimer.

(21) Appl. No.: 17/987,706

(22) Filed: Nov. 15, 2022

(65) Prior Publication Data

US 2023/0147817 A1 May 11, 2023

Related U.S. Application Data

(63) Continuation of application No. 16/745,710, filed on Jan. 17, 2020, now Pat. No. 11,533,540, which is a
(Continued)

(30) Foreign Application Priority Data

Aug. 22, 2019 (CN) .......................... 201910778699.7

(51) Int. Cl.
*H04N 21/45* (2011.01)
*G06Q 10/02* (2012.01)
(Continued)

(52) U.S. Cl.
CPC .......... *H04N 21/458* (2013.01); *G06Q 10/02* (2013.01); *G06Q 10/025* (2013.01);
(Continued)

(58) Field of Classification Search
CPC ............... H04N 21/458; H04N 21/262; H04N 21/44204; H04N 21/4524; H04N 21/4622;
(Continued)

(56) References Cited

U.S. PATENT DOCUMENTS 6,564,381 B1 * 5/2003 Hodge ............. H04N 21/26241
 725/35
7,415,424 B1 * 8/2008 Donner .................. G06Q 20/20
 235/382
(Continued)

FOREIGN PATENT DOCUMENTS

CN  1335723 A  2/2002
CN  106412641 A  2/2017
(Continued)

OTHER PUBLICATIONS

Final Office Action mailed Aug. 26, 2021, for U.S. Appl. No. 16/745,710, filed Jan. 17, 2020, eleven pages.
(Continued)

*Primary Examiner* — Timothy R Newlin
(74) *Attorney, Agent, or Firm* — Morrison & Foerster LLP

(57) ABSTRACT

The present disclosure relates to a method, apparatus, and system for realizing dynamic scheduling for a cinema and controlling playing of a movie. In particular, embodiments of the present invention relate to dynamic scheduling of content presentation in a cinema by collecting user preferences of a plurality of users, wherein the user preference specifies at least a movie that a user desires to watch, a time for watching the movie, a cinema for watching the movie, and a number of people watching the movie; generating, based on the collected user preferences, a respective dynamic schedule for at least one cinema of a plurality of cinemas according to one of a plurality of scheduling
(Continued)

schemes; and transmitting the generated respective dynamic schedule to at least one second electronic apparatus corresponding to the at least one cinema.

17 Claims, 7 Drawing Sheets

Related U.S. Application Data continuation-in-part of application No. 15/953,383, filed on Apr. 13, 2018, now Pat. No. 10,798,460.

(51) Int. Cl.
| | |
|---|---|
| *G06Q 10/0631* | (2023.01) |
| *G06Q 10/101* | (2023.01) |
| *H04N 21/262* | (2011.01) |
| *H04N 21/442* | (2011.01) |
| *H04N 21/458* | (2011.01) |
| *H04N 21/462* | (2011.01) |
| *H04N 21/475* | (2011.01) |
| *H04N 21/482* | (2011.01) |

(52) U.S. Cl.
CPC ... *G06Q 10/063116* (2013.01); *G06Q 10/101* (2013.01); *H04N 21/262* (2013.01); *H04N 21/44204* (2013.01); *H04N 21/4524* (2013.01); *H04N 21/4622* (2013.01); *H04N 21/4755* (2013.01); *H04N 21/482* (2013.01)

(58) Field of Classification Search
CPC ............. H04N 21/4755; H04N 21/482; H04N 21/25435; H04N 21/25891; H04N 21/26241; H04N 21/41415; H04N 21/252; G06Q 10/02; G06Q 10/025; G06Q 10/063116; G06Q 10/101
See application file for complete search history.

(56) References Cited

U.S. PATENT DOCUMENTS

| | | | | |
|---|---|---|---|---|
| 8,281,344 | B1* | 10/2012 | Mathias | H04N 21/4825 |
| | | | | 725/74 |
| 8,984,015 | B1* | 3/2015 | Toader | G06Q 50/01 |
| | | | | 707/792 |
| 9,117,220 | B2 | 8/2015 | Whalin et al. | |
| 10,798,460 | B2 | 10/2020 | Chong et al. | |
| 11,533,540 | B2 | 12/2022 | Chong et al. | |
| 2003/0040946 | A1* | 2/2003 | Sprenger | G06Q 10/025 |
| | | | | 705/6 |
| 2003/0187802 | A1 | 10/2003 | Booth | |
| 2004/0059643 | A1 | 3/2004 | Marti | |
| 2004/0109137 | A1* | 6/2004 | Bubie | H04N 21/41415 |
| | | | | 348/E7.063 |
| 2004/0181807 | A1 | 9/2004 | Theiste et al. | |
| 2007/0171374 | A1* | 7/2007 | Moore | G03B 21/32 |
| | | | | 352/40 |
| 2007/0186253 | A2 | 8/2007 | Hunter | |
| 2007/0226080 | A1* | 9/2007 | Chessick | G06Q 30/0613 |
| | | | | 705/26.61 |
| 2009/0112676 | A1* | 4/2009 | Reich | G06Q 40/12 |
| | | | | 707/999.009 |
| 2009/0186700 | A1* | 7/2009 | Konkle | A63F 13/12 |
| | | | | 463/42 |
| 2010/0058379 | A1 | 3/2010 | Lin et al. | |
| 2010/0114643 | A1* | 5/2010 | Redmann | G06Q 10/063 |
| | | | | 706/47 |
| 2010/0131366 | A1 | 5/2010 | Gibson et al. | |
| 2012/0016718 | A1* | 1/2012 | Kahn | G06Q 30/0202 |
| | | | | 705/7.31 |
| 2014/0019173 | A1 | 1/2014 | Spindler | |
| 2014/0032250 | A1* | 1/2014 | Oxenham | G01C 21/206 |
| | | | | 705/5 |
| 2014/0343976 | A1* | 11/2014 | Ahluwalia | G06Q 50/12 |
| | | | | 705/5 |
| 2015/0154571 | A1 | 6/2015 | Zamer | |
| 2015/0254580 | A1* | 9/2015 | Gupta | G06Q 10/02 |
| | | | | 705/5 |
| 2016/0148126 | A1* | 5/2016 | Paleja | G06Q 30/0269 |
| | | | | 705/5 |
| 2017/0308931 | A1 | 10/2017 | Jaeger | |
| 2017/0308961 | A1 | 10/2017 | Jaeger | |
| 2017/0333779 | A1 | 11/2017 | El Labban | |
| 2018/0137205 | A1 | 5/2018 | Jaeger | |
| 2019/0180297 | A1* | 6/2019 | Bhatia | G06Q 30/0206 |

FOREIGN PATENT DOCUMENTS

| | | |
|---|---|---|
| CN | 109068168 A | 12/2018 |
| CN | 109523322 A | 3/2019 |
| WO | 2019198057 A2 | 10/2019 |

OTHER PUBLICATIONS

International Preliminary Report on Patentability mailed Oct. 22, 2020, for PCT Application No. PCT/IB2019/053054, filed Apr. 13, 2019, six pages.

International Search Report and Written Opinion mailed Nov. 19, 2019, for PCT Application No. PCT/IB2019/053054, filed Apr. 13, 2019, seven pages.

Non-Final Office Action mailed Dec. 22, 2020, for U.S. Appl. No. 16/745,710, filed Jan. 17, 2020, seventeen pages.

Non-Final Office Action mailed Nov. 25, 2019, for U.S. Appl. No. 15/953,383, filed Apr. 13, 2018, fifteen pages.

Notice of Allowance mailed Aug. 26, 2022, for U.S. Appl. No. 16/745,710, filed Jan. 17, 2020, eight pages.

Notice of Allowance mailed Jun. 15, 2020, for U.S. Appl. No. 15/953,383, filed Apr. 13, 2018, seven pages.

\* cited by examiner

METHOD, APPARATUS AND SYSTEM FOR REALIZING DYNAMIC SCHEDULING FOR A CINEMA AND CONTROLLING PLAYING OF A MOVIE

CROSS-REFERENCE TO RELATED APPLICATIONS

This application is a continuation of U.S. Non-Provisional application Ser. No. 16/745,710, filed on Jan. 17, 2020, which claims the benefit of priority and is a continuation-in-part to U.S. Non-Provisional application Ser. No. 15/953,383, filed on Apr. 13, 2018, now U.S. Pat. No. 10,798,460, and this application claims priority under 35 U.S.C. § 119 to Chinese patent application CN 201910778699.7, filed Aug. 22, 2019, the contents of which are incorporated by reference herein in their entirety.

FIELD OF THE DISCLOSURE

The present disclosure relates to movie scheduling and playing for a cinema, and in particular, to a method, apparatus, and computer readable medium for realizing dynamic scheduling for a cinema, to a method, apparatus, and computer readable medium for controlling playing of a movie according to a dynamic schedule, and to a cinema system.

BACKGROUND OF THE DISCLOSURE

Traditionally, cinemas play movies according to schedules that are predetermined manually. For example, a cinema scheduling team arranges and fixes a movie schedule several days before movies being played, and inputs the fixed schedule data into a cinema management system. Subsequently, a cinema play system can receive the fixed schedule data from the cinema management system, and play movies according to the fixed schedule data. In addition, traditionally, each of cinemas arranges its respective schedule independently and plays movies accordingly.

However, according to this traditional mode, the movie-goer's preferences (e.g. movie, date and time for watching, and cinema, etc.) are not taken into account when arranging the movie schedule, especially because each of cinemas arranges its respective schedule independently, it is difficult to take the movie-goer's preference regarding cinema into account during the scheduling. Even if it is tried to take into account such a preference, scheduling as per the traditional mode will require huge amount of manual work.

Therefore, there is a need for a solution that enables generating respective dynamic schedules for multiple cinemas flexibly and automatically based on movie-goer's preferences, and each of the cinemas controlling playing movies according to its dynamic schedule.

SUMMARY OF THE DISCLOSURE

The present disclosure provides a solution that enables generating respective dynamic schedules for multiple cinemas flexibly and automatically based on movie-goer's preferences, and each of the cinemas controlling playing a movie according to its dynamic schedule.

According to an aspect of the present disclosure, a method for realizing dynamic scheduling for a cinema is provided, the method being performed by a first electronic apparatus, characterized in that, the method comprises: collecting user preferences of a plurality of users, wherein the user preference specifies at least a movie that a user desires to watch, a time for watching the movie, a cinema for watching the movie, and a number of people watching the movie; generating, based on the collected user preferences, a respective dynamic schedule for at least one cinema of a plurality of cinemas according to one of a plurality of scheduling schemes; and transmitting the generated respective dynamic schedule to at least one second electronic apparatus corresponding to the at least one cinema.

According to an aspect of the present disclosure, an electronic apparatus for realizing dynamic scheduling for a cinema is provided, the electronic apparatus comprises a memory having computer executable instructions stored thereon and a processor, the computer executable instructions, when executed by the processor, causing the apparatus to perform the method for realizing dynamic scheduling for a cinema as described above.

According to an aspect of the present disclosure, a method for controlling playing a movie according to a dynamic schedule is provided, the method being performed by a second electronic apparatus, characterized in that, the method comprises: receiving a dynamic schedule from a first electronic apparatus; and controlling playing the movie based on the dynamic schedule, wherein, the dynamic schedule is generated based on a plurality of user preferences according to one of a plurality of scheduling schemes, wherein the user preference specifies at least a movie that the user desires to watch, a time for watching the movie, a cinema for watching the movie, and the number of people watching the movie.

According to an aspect of the present disclosure, an electronic apparatus for controlling playing a movie according to a dynamic schedule is provided, the electronic apparatus comprises a memory having computer executable instructions stored thereon and a processor, the computer executable instructions, when executed by the processor, causing the apparatus to perform the method for controlling playing a movie according to a dynamic schedule as described above.

According to an aspect of the present disclosure, a computer readable medium having computer executable instructions stored thereon is provided, the computer executable instructions, when executed by a processor, cause the processor to perform the method for realizing dynamic scheduling for a cinema or the method for controlling playing a movie according to the dynamic schedule as described above.

According to an aspect of the present disclosure, a cinema system is provided, the cinema system comprises an electronic apparatus for realizing dynamic scheduling for a cinema as described above and one or more electronic apparatus for controlling playing a movie according to a dynamic schedule as described above.

BRIEF DESCRIPTION OF THE DRAWINGS

The accompanying drawings, which are incorporated in and constitute a part of the specification, illustrate embodiments of the disclosure, and are used in conjunction with the description to explain the principles of the present disclosure.

DETAILED DESCRIPTION

Figure 1:
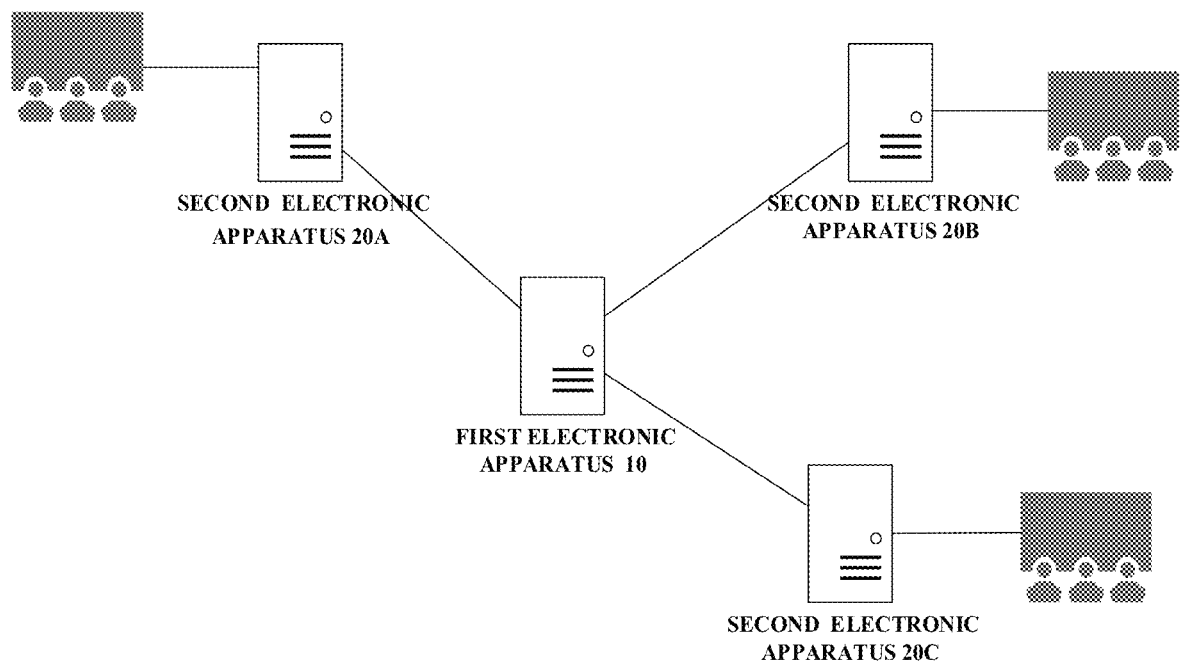
FIG. 1 is a schematic diagram of a cinema system in accordance with the present disclosure.

Preferred embodiments of the present disclosure will be described in detail below with reference to the accompanying drawings.

Representative applications of an apparatus and a method in accordance with implementations described herein are provided in this section. These examples are provided only to add context and to aid in understanding the described implementations. It will be apparent to those skilled in the art that the implementations of the present disclosure can be practiced without some or all of these specific details. In other instances, well known process steps have not been described in detail in order to avoid unnecessarily obscuring the implementations described herein. Other applications are also possible, such that the following examples should not be considered as limiting.

Note that similar reference numerals and letters refer to similar items in the figures, thus once an item is defined in a figure, it is not necessarily to be discussed in the following figures.

FIG. 1 illustrates an exemplary cinema system in accordance with the present disclosure. As shown in FIG. 1, the exemplary cinema system may include a first electronic apparatus 10 for realizing dynamic scheduling for a cinema and a second electronic apparatus 20A-20C associated with respective cinema for controlling playing a movie in accordance with a dynamic schedule. Hereinafter, an electronic apparatus for realizing dynamic scheduling for a cinema is collectively referred to as a first electronic apparatus and an electronic apparatus for controlling playing a movie in accordance with a dynamic schedule is collectively referred to as a second electronic apparatus. Although three of the second electronic apparatus are illustrated in FIG. 1, the cinema system may include more or less second electronic apparatus, and more generally, the cinema system in accordance with the present disclosure may include one or more second electronic apparatus (for example, hundreds of). In particular, the plurality of second electronic apparatus may be in the same or different regions. According to the present disclosure, the first electronic apparatus 10 may collect user preferences of a plurality of users, wherein the user preference specifies at least a movie that a user desires to watch, a time for watching the movie, a cinema for watching the movie, and a number of people watching the movie; generating, based on the collected user preferences, a respective dynamic schedule for at least one cinema of a plurality of cinemas according to one of a plurality of scheduling schemes; and transmitting the generated respective dynamic schedule to at least one second electronic apparatus corresponding to the at least one cinema. According to the present disclosure, the second electronic apparatus 20A-20C can receive a dynamic schedule from the first electronic apparatus; and control playing of a movie based on the dynamic schedule, wherein the dynamic schedule is generated based on a plurality of user preferences, according to one of a plurality of scheduling schemes.

Thereby, the system according to the present disclosure can automatically generate a respective dynamic schedule for one or more cinemas collectively based on user preferences by means of the first electronic apparatus, and can control, by means of the second electronic apparatus, the playing of movie(s) in the cinema associated with the second electronic apparatus based on the respective dynamic schedule received from the first electronic apparatus, thereby enabling movie-goers to flexibly choose the cinema, date, time, and movie to watch according to their needs.

An exemplary cinema system in accordance with the present disclosure is briefly introduced above in conjunction with FIG. 1, and embodiments of the present disclosure will be explained in detail below with reference to the drawings.

Figure 2:
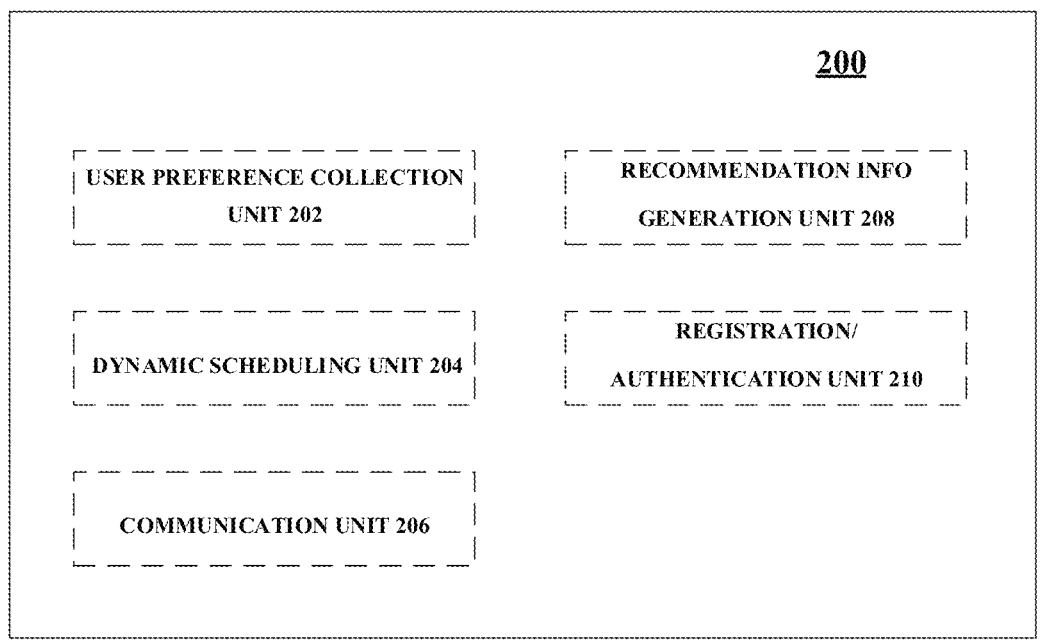
FIG. 2 is a schematic diagram of a structural configuration of an electronic apparatus for realizing dynamic scheduling for a cinema, according to an embodiment of the present disclosure.

FIG. 2 illustrates a schematic structural configuration of an electronic apparatus 200 (hereinafter simply referred to as a first electronic apparatus 200) for realizing dynamic scheduling for a cinema according to an embodiment of the present disclosure. As shown in FIG. 2, the first electronic apparatus 200 may include a user preference collection unit 202, a dynamic scheduling unit 204, a communication unit 206, a recommendation information generation unit 208, and a registration/authentication unit 210. Although FIG. 2 illustrates the above five units, the first electronic apparatus 200 may further include other possible units, or a combination of units including any of above five units.

The user preference collection unit 202 is configured, for example, to collect user preferences of a plurality of users. The user preference, for example, specifies at least a movie that a user desires to watch, a time for watching the movie, a cinema for watching the movie, and the number of people watching the movie. It is to be noted that the term "time" herein generally has its broad meaning unless otherwise explicitly stated, for example, "time" may include the date and the hour in a day. The user preference may also specify other content, for example, but not limited to, a type of consumption (such as block booking or retail), a hall in the cinema (for example, a specific hall or a type of hall (such as IMAX, 4K, VIP halls, general halls, and the like) may be specified), as well as seating regions (such as row regions, column regions, or block regions composed of specific rows and columns) may be specified.

The user preference collection unit 202 can collect user preferences in a variety of ways. For example, user preferences can be received from a user through a particular webpage interface or application interface. The webpage interface or application interface can provide a corresponding interface for the user to specify or choose their respective preferences from a list conveniently.

According to the present disclosure, the collected user preferences may be stored, for example, in the form of a database in a storage accessible by the first electronic apparatus 200 or in a storage disposed within the first electronic apparatus 200. The database can be implemented by employing a variety of database techniques known in the art.

The dynamic scheduling unit 204 is configured, for example, to generate a respective dynamic schedule for at least one of multiple cinemas according to one of a plurality of scheduling schemes, based on the collected user preferences. The plurality of scheduling schemes may include, for example, a first scheme based on a number of movie-goers, a second scheme based on an amount of money, and a third scheme based on a type of consumption.

Generating the dynamic schedule according to the first scheme comprises, for example, calculating a number of people who desire to watch a same movie in a same cinema at a close time based on the collected user preferences of the plurality of users, and in the case that the calculated number of people is greater than a first threshold, confirming a schedule for the movie for the cinema at the time.

Specifically, according to the first scheme, the dynamic scheduling unit 204 may, based on the collected user preferences of a plurality of users, sequentially sort the respective contents specified in the user preferences, so as to calculate the number of people who desire to view the same movie in the same cinema at a close time. For example, the dynamic scheduling unit 204 may first sort the movies, then sort the cinemas for user preference data that specifies the same movie, and then further sort the time for user preference data that specifies the same cinema, thereby, the user preference data group obtained by sorting is one or more pieces of user preference data specifying the same movie, the same cinema, and the close time, so that the number of movie-goers can be conveniently counted within the set of user preference data to decide whether a schedule can be confirmed. According to the present disclosure, the above process of sorting the respective contents specified in the user preferences may also be performed in other orders (may be in the order of, such as, movie, cinema and time, or time, movie and cinema, etc.) as long as the user preference data set that specifies the same movie, the same cinema, and the close time can be finally obtained.

According to the first scheme, the close time may represent the same time period, or represents a difference between the time points at which different users desire to watch the movie is less than a third threshold (e.g., 1 hour or another threshold that may be determined according to actual situations.) This makes it possible to collect the time period (for example, 2 pm to 3 pm on a certain day in a certain month in a certain year) and/or the time point (for example, 2 pm on a certain day in a certain month in a certain year) when the user desires to watch the movie while collecting user preferences. The dynamic scheduling unit 204 can determine the specific time of the movie schedule according to the sorting result for the close time. For example, the dynamic scheduling unit 204 may determine any suitable time in the time period specified in the user preference or in the time period determined based on the sorting result of the close time in the case that the user preference specifies the time point, as the schedule time at which the movie is to be played, in consideration of factors such as user preferred watching time of other movies which the schedules thereof are to be confirmed in the same cinema on the same day, the duration of each movie, the interval between movies, and the duration of playing advertisements and the like.

According to the first scheme, the first threshold value associated with the calculated number of people watching the movie for confirming the schedule may be flexibly set or dynamically adjusted according to actual situations. For example, the threshold can be set in accordance with the number of seats in respective hall of a cinema and the expected attendance rate. Further, in the case that the preference data includes the hall desired by the user, the threshold may also be dynamically adjusted according to the specified hall or the type of the hall. For example, in the case that the type of the hall is VIP hall, the threshold can be adjusted to be relatively small, while in the case that the type of the hall refers to lots of seats, such as IMAX, the threshold can be adjusted to be relatively large. As another example, the threshold may be set or dynamically adjusted in accordance with the time for watching the movie specified in the user preference. For example, at unpopular time such as the morning of a day or working days of a week, the threshold may be appropriately determined to be a relatively small value, and at popular time such as the evening of a day or festivals or holidays, the threshold may be appropriately determined to be a relatively large value. In this way, by setting or dynamically adjusting the first threshold, it is possible to balance user needs as well as the commercial needs of different cinemas.

Generating the dynamic schedule according to the second scheme comprises, for example, calculating a turnover of playing a same movie in a same cinema at a close time based on the collected user preferences of the plurality of users and a pricing of a specific movie in a specific cinema, and in the case that the calculated turnover is greater than a second threshold, confirming a schedule for the movie for the cinema at the time.

Specifically, in the case of generating the dynamic schedule according to the second scheme, the first electronic apparatus 200 may also collect pricing information of different cinemas for different movies. For example, the first electronic apparatus 200 may request pricing information of movies to each second electronic apparatus associated with each cinema. For another example, each second electronic apparatus associated with each cinema can periodically transmit the pricing information of movies to the first electronic apparatus.

According to the second aspect, the dynamic scheduling unit 204 may, based on the collected user preferences of a plurality of users, sequentially sort the respective contents specified in the user preferences, to facilitate calculation of the number of people who desire to watch the same movie in the same cinema at a close time, and calculate the turnover of playing the same movie in the same cinema at the close time based on the number of people and the pricing information collected. The sorting method is similar to the one described above, and will not be repeated here.

According to the second scheme, the turnover can be calculated simply by multiplying the pricing of the movie by the number of people watching the movie. Alternatively, the operating cost of the cinema can also be considered, and the turnover is calculated by multiplying the pricing of the movie by the number of people watching the movie and subtracting the operating cost. In consideration of the operating cost of the cinema, the first electronic apparatus 200 may also collect operating costs of different cinemas for different movies periodically or based on requests.

Similar to the first scheme, in the second scheme, the close time may represent the same time period, or may represent that the difference between the time points at which different users desire to watch the movie is less than a predetermined threshold (for example, 1 hour or another threshold that may be determined according to actual situations.) And, the dynamic scheduling unit 204 determines the specific time of the movie schedule according to the sorting result for the close time in a manner similar to the first scheme.

According to a second aspect, the second threshold associated with the calculated turnover for confirming the schedule may be flexibly set or dynamically adjusted according to actual situations. For example, the threshold can be set or dynamically adjusted according to the time for watching the movie specified in the user preference. For example, at unpopular time such as the morning of a day or working days of a week, the threshold may be appropriately determined to be a relatively small value, and at popular time such as the evening of a day or festivals or holidays, the threshold may be appropriately determined to be a relatively large value. In this way, by setting or dynamically adjusting the second threshold, it is possible to balance user needs as well as the commercial needs of different cinemas.

According to the present disclosure, the plurality of scheduling schemes may also include a third scheme based on the type of consumption, which may be, for example, block booking or non-block booking (e.g., retail). Generating the dynamic schedule according to the third scheme comprises, for example, in the case that the type of consumption is block booking, confirming a schedule for the movie for the cinema at the time, and in the case that the type of consumption is not block booking, generating the dynamic schedule according to the above first scheme or the second scheme. In particular, in the case that the user preference does not specify the type of consumption, the type of consumption can be set to a default value that is non-block booking. In the case that the type of consumption is block booking, in the process of determining the specific scheduling time, similar to the first scheme and the second scheme, the dynamic scheduling unit 204 may determine any suitable time in the time period specified in the user preference or in the time period determined based on the sorting result of the close time in the case that the user preference specifies the time point, as the schedule time at which the movie is to be played, in consideration of factors such as user preferred watching time of other movies which the schedules thereof are to be confirmed in the same cinema on the same day, the duration of each movie, the interval between movies, and the duration of playing advertisements and the like.

The three schemes for generating the dynamic schedule have been detailed above. In practice, the dynamic scheduling unit 204 can select the appropriate scheme for each cinema to perform dynamic scheduling according to different needs. In other words, the scheduling schemes may be different for a plurality of different cinemas corresponding to the first electronic apparatus 200. For example, for a newly opened cinema or a cinema with a relatively small number of movie-goers due to geographical location, etc., the first scheme based on the number of movie-goers can be selected to generate the dynamic schedule, so that it is convenient to determine the schedule based on the number of people. For another example, for a cinema where the number of movie-goers is usually large and it is easy to cause conflicts only based on the number of movie-goers, or for a cinema with higher turnover requirement, the second scheme based on the amount of money can selected, so that the schedule can be confirmed in comprehensive consideration of the economic benefits of the cinema on the basis of the number of movie-goers. The factors of the above-mentioned for assisting in selecting a dynamic scheduling scheme are merely exemplary, and those skilled in the art may also select respective dynamic scheduling scheme for cinemas according to actual situations in connection with commercial needs in consideration of other factors.

Further, in the case that schedules for a plurality of movies in a certain period of time in the same cinema are confirmed, the dynamic scheduling unit 204 can arrange respective hall for each movie based on factors such as the number of seats in each hall of the cinema, the hall or the type of the hall specified in the user's preference, and the number of people watching the movie in the confirmed schedule and the like, and add the arranged hall information to the respective dynamic schedule data.

According to the present disclosure, in the case that there is a scheduling conflict for different movies at the same time in the same cinema, the dynamic scheduling unit 204 may also confirm the schedule according to any one or more of the following: a time when the user provided the user preference, a user's identity and a turnover of playing the movie. For multiple sets of user preference data with scheduling conflict, the dynamic scheduling unit 204 can confirm the schedule based on the user preference data set corresponding to one or more users who provided the user preference(s) earliest. For example, assuming that there is a scheduling conflict for two sets of user preferences, the time when each user provided its user preference in the two sets of user preference data can be compared, and the schedule is confirmed based on the user preference set corresponding to the user who provided its user preference data earliest, alternatively, the number of times that a user provided its user preference earlier than a certain time in the two sets can be counted respectively, thereby the user preference set with higher number counted is selected to confirm the schedule based thereon. The dynamic scheduling unit 204 can confirm the schedule based on the user's identity, i.e., whether the user is a high priority user (e.g., a VIP user) in the event of a scheduling conflict. For example, assuming that there is a scheduling conflict for two sets of user preferences, the number of users with high priority in the two sets can be counted respectively, thereby the user preference set with higher number counted is selected to confirm the schedule based thereon. The dynamic scheduling unit 204 can also confirm the schedule in the event of a scheduling conflict based on the turnover of playing the movie. For example, in the event of a conflict, a set of user preferences with a higher turnover can be selected to confirm the schedule based thereon.

The dynamic scheduling unit 204 can also confirm the schedule in the event of a conflict based on a combination of two or three of: a time when the user provided the user preference, a user's identity, and a turnover of playing the movie. For example, one factor may be considered first, and the other one or more factors may be further considered to confirm the schedule only if the scheduling conflict cannot be resolved based solely on that factor. Alternatively, the dynamic scheduling unit 204 may also allocate certain weights to the above three factors, and comprehensively consider the three factors to resolve the scheduling conflict based on the weighted calculation score. For example, assuming that there is a scheduling conflict for two sets of user preferences, a weight of 0.1 may be allocated for the time when the user provided the user preference, a weight of 0.4 for the user's identity, and a weight of 0.5 for the turnover of playing the movie, and the dynamic scheduling unit 204 may determine how to confirm the schedule for the three factors, respectively, for example, assuming that, for the time that the user provided the user preference alone, it is determined that the schedule should be confirmed based on set A, for the user's identity alone, it is determined that the schedule should be confirmed based on set B, and for the turnover alone, it is determined that the schedule should be confirmed based on set A, then with comprehensive consideration of these three factors, the score for set A can be 0.1+0.5=0.6, and the score for set B can be 0.4, due to the score for set A is higher than the score for set B, it is finally determined that the schedule is to be confirmed based on set A.

According to the present disclosure, the communication unit 206 can be configured to transmit the recommendation information generated by the recommendation information generation unit 208 to the user corresponding to a user preference in the case that the schedule that satisfies the user preference cannot be confirmed; transmit the generated respective dynamic schedule to at least one second electronic apparatus corresponding to at least one cinema; and communicate with the second electronic apparatus corresponding to each cinema under control of the registration/authentication unit 210, such that each second electronic apparatus registers with the first electronic apparatus. This will be detailed separately below.

According to the present disclosure, the communication unit 206 can be configured to, for a user preference of at least one user, transmit recommendation information to the user in the case that the schedule that satisfies the user preference is not confirmed. The communication unit 206 can transmit the recommendation information to the user via a specific webpage interface, an application interface, or an SMS message.

The recommendation information may be generated by the recommendation information generating unit 208. The recommendation information may include one or more of the following information related to the schedules that have been confirmed: first alternative schedule information, wherein the cinema for the first alternative schedule is the same as the cinema specified in the user preference, the time for watching a movie for the first alternative schedule is close to the time specified in the user preference, while the movie for the first alternate schedule is different from the movie specified in the user preference; second alternative schedule information, wherein the movie for the second alternate schedule is the same as the movie specified in the user preference, the time for watching the movie for the second alternate schedule is close to the time specified in the user preference, while the cinema for the second alternate schedule is different from the cinema specified in the user preference; third alternative schedule information, wherein the movie and the cinema for the third alternate schedule are the same as the movie and cinema specified in the user preference, while the time for watching the movie for the third alternate schedule is different from the time specified in the user preference. It is to be noted that, in the description of the above alternative schedule information, the time for watching a movie being close to the time specified in the user preference indicates that the time for watching a movie falls within the time period specified in the user preference, or indicates that the difference between the time for watching a movie and the time specified in the user preference is less than a predetermined threshold.

According to the present disclosure, the communication unit 206 can be configured to communicate the generated respective dynamic schedules to at least one second electronic apparatus corresponding to at least one cinema. The communication unit 206 does not need to transmit all of the generated dynamic schedules (for all cinemas in the cinema system) to each of the second electronic apparatus. In other words, the communication unit 206 can transmit the dynamic schedule for a specific cinema to the second electronic apparatus corresponding to that cinema, thereby performing targeted transmission to reduce the amount of transmission data and simplify the processing of the second electronic apparatus at the receiving end.

According to the present disclosure, the communication unit 206 can transmit a dynamic schedule for a specific time period for a cinema corresponding to the second electronic apparatus to the second electronic apparatus based on the request of the second electronic apparatus. For example, the request may include time period information corresponding to the dynamic schedule, such as the request may include a request for a dynamic schedule of a certain day or may include a request for a dynamic schedule for a certain number of days. In this case, the first electronic apparatus 200 may check the time period included in the request to confirm that the time period corresponds to a future time period and there is an already confirmed dynamic schedule for the time period, and in the case that the check fails (for example, the time period corresponds to elapsed time, or there is no dynamic schedule for the time period), a corresponding notification is made to the second electronic apparatus via the communication unit 206.

Alternatively, the request may not include any time period information, and the first electronic apparatus 200 may transmit a dynamic schedule for a specific time period for the cinema corresponding to the second electronic apparatus to the second electronic apparatus via the communication unit 206 based on the agreement of the first electronic apparatus and the second electronic apparatus corresponding to the cinema. In this case, the specific time period may be the second day or a certain day following arbitrary number of days after the first electronic apparatus having received the request, or may be certain several days following arbitrary number of days after the first electronic apparatus having received the request. In other words, in the case that the request information does not include the time period information, the first electronic apparatus may, based on the agreement, via the communication unit, transmit the dynamic schedule for the cinema corresponding to the second electronic apparatus for the second day or a certain day following arbitrary number of days or certain several days following arbitrary number of days after having received the request to the second electronic apparatus. This approach can advantageously simplify the content of the request, thereby facilitating the corresponding processing by both electronic apparatus.

Alternatively, the request may also be made for one or some particular movies. For example, the request received by the first electronic apparatus can include a particular one or more movie names and/or movie identifiers. Based on such a request, the first electronic apparatus may first check whether the movie names and/or the movie identifiers included in the received request are included in a known movie list, which corresponds to movies that the cinema corresponding to the second electronic apparatus which made the request can retrieve. In the case that the movie names and/or the movie identifiers included in the request are included in the known movie list, the first electronic apparatus may transmit only dynamic schedules related to the movie names and/or the movie identifiers to the second electronic apparatus via the communication unit 206. Similarly, such a request including movie names and/or movie identifiers may also include or not include time period information as described above.

According to the present disclosure, in the case of transmitting a dynamic schedule based on a request, the first electronic apparatus may further authenticate the second electronic apparatus which made the request based on registration information by means of the registration/authentication unit 210, and in the case that the authentication fails, transmit the information of request failure to the second electronic apparatus through the communication unit 206 to reject the request. The registration/authentication process regarding the second electronic apparatus will be described below with reference to the registration/authentication unit 210.

According to the present disclosure, the communication unit 206 can also periodically transmit the generated respective dynamic schedule to at least one second electronic apparatus corresponding to at least one cinema. For example, the generated dynamic schedule can be transmitted to the second electronic apparatus a few days or hours before the show time specified in the confirmed dynamic schedule without waiting for a request from the second electronic apparatus.

According to the present disclosure, the communication unit 206 can be configured to communicate the generated respective dynamic schedules to at least one second electronic apparatus corresponding to at least one cinema. Prior to transmitting the dynamic schedules, the communication unit 206 can be configured to process dynamic schedules in accordance with a predetermined protocol, and the processing enables the second electronic apparatus to interpret the received data. For example, the communication unit 206 can encapsulate the dynamic schedule data in accordance with rules specified in the predetermined protocol agreed between the first electronic apparatus and the second electronic apparatus. For example, the rules may specify fields related to the dynamic schedule data and data content within the fields. One example of the rules could be: {name: "movie name", date: "2019-08-01", time: "13:14:00", zone: "UTC", hall: "hall number" }, where, "name", "date", "time", "zone", and "hall" represent fields in which the movie name, date, time, time zone, and hall number can be encapsulated accordingly. It should be noted that the rule is merely an exemplary rule, and other rules may be determined according to actual situations. For example, more or fewer fields may be included, and the content and length of the data within the field are correspondingly defined. According to the present disclosure, the communication unit 206 can utilize any of the known transmission layer protocols (e.g., such as TCP and UDP) to communicate the dynamic schedule data processed as described above.

According to the present disclosure, the communication unit 206 can also be configured to encrypt the generated respective dynamic schedules to communicate the encrypted dynamic schedule data to at least one second electronic apparatus corresponding to at least one cinema.

According to the present disclosure, the communication unit 206 may be configured to communicate with the second electronic apparatus corresponding to each cinema under the control of the registration/authentication unit 210 to cause each second electronic apparatus to register with the first electronic apparatus. Description will be made below in conjunction with the registration/authentication unit 210.

According to the present disclosure, the second electronic apparatus may register with the first electronic apparatus at the system configuration stage or when a new second electronic apparatus corresponding to a new movie cinema is added to the cinema system according to the present disclosure. For example, the registration/authentication unit 210 of the first electronic apparatus may receive the identity information of the second electronic apparatus (such as the city, region where the cinema is located, and cinema name) from the second electronic apparatus for registration. The registration/authentication unit 210 stores the identity information in a respective storage and allocates a unique identifier (e.g., ID) to each of the second electronic apparatus.

Alternatively, the registration/authentication unit 210 may require the second electronic apparatus to set its identifier on the second electronic apparatus side based on the identifier rule (e.g., set by the second electronic apparatus itself or set by the user of the second electronic apparatus), In this case, the registration/authentication unit 210 can check whether the received identifier is duplicated with an existing identifier, and in the case of duplication, prompt to the second electronic apparatus via the communication unit 206 to reset the identifier.

According to the present disclosure, upon receiving a request for a dynamic schedule from the second electronic apparatus via the communication unit 206, the registration/authentication unit 210 may authenticate the second electronic apparatus based on the identifier of the second electronic apparatus included in the request. For example, the registration/authentication unit 210 can retrieve among the stored registered identifiers to determine if there is an identifier that matches the identifier contained in the received request, and determine authentication failed if there is no matching identifier. Further, to improve security, the authentication process may also include a challenge process known in the art.

The structural configuration of the first electronic apparatus 200 according to the present disclosure has been described in detail above. A schematic operational flow 300 of an electronic apparatus for realizing dynamic scheduling for a cinema according to an embodiment of the present disclosure will be described with reference to FIG. 3 below.

Figure 3:
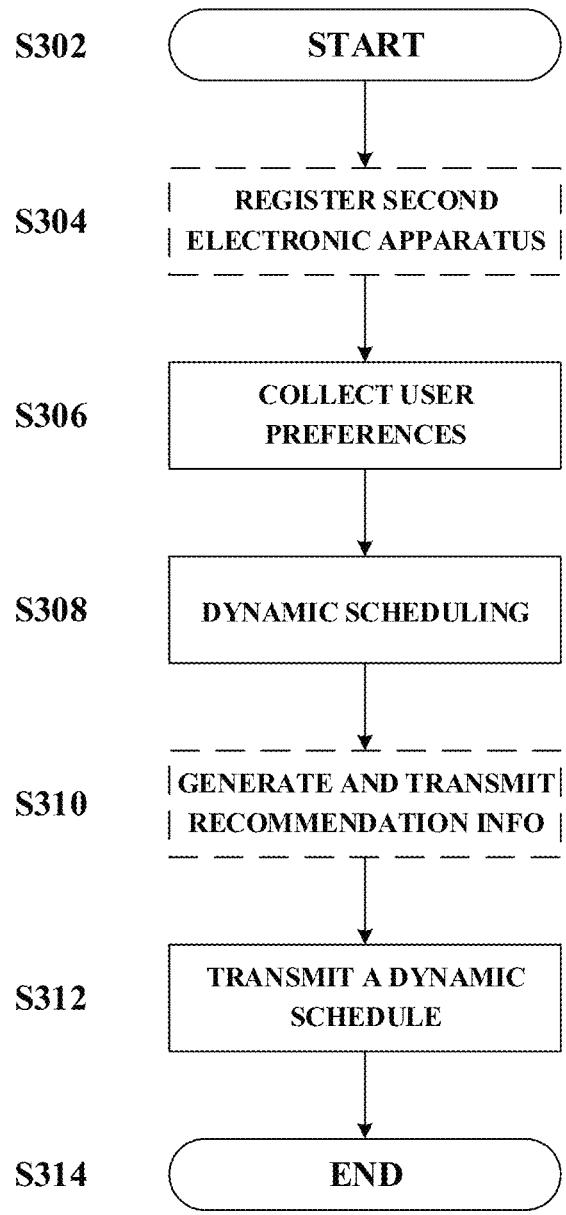
FIG. 3 is a flowchart of a schematic operational flow of an electronic apparatus for realizing dynamic scheduling for a cinema, according to an embodiment of the present disclosure.

As shown in FIG. 3, the operational flow begins at step S302. At step S304, the first electronic apparatus communicates with each second electronic apparatus corresponding to each cinema to cause each second electronic apparatus to register with the first electronic apparatus. As described above, registration may occur during initial configuration of the cinema system or when a new second electronic apparatus corresponding to a new cinema is newly added to the cinema system. For the second electronic apparatus that has been registered with the first electronic apparatus, the registration step can be omitted.

Subsequently, at step S306, the first electronic apparatus collects user preference data of a plurality of users. The specific operations related to collecting user preferences have been described in detail above with reference to the user preference collection unit 202, and will not be repeated here again.

Subsequently, at step S308, the first electronic apparatus generates a respective dynamic schedule for at least one of the plurality of cinemas according to one of the plurality of scheduling schemes based on the collected user preferences. As described above, the plurality of scheduling schemes may include a first scheme based on the number of moviegoers, a second scheme based on the amount of money, and a third scheme based on the type of consumption. The first electronic apparatus can select different schemes for each cinema to perform dynamic scheduling according to different needs of each cinema. In the operation of determining the dynamic schedule, the first electronic apparatus may also determine the schedule that can be confirmed according to one or more of the time that user preference was provided, the user's identity, and the turnover of playing movie, in the case that there is a scheduling conflict.

Next, optionally, in the case that the schedule that satisfies the user preference for a certain user cannot be confirmed, at step S310, the first electronic apparatus generates recommendation information based on the user preference and the determined schedule(s) and may transmit the generated recommendation information to the user. The recommendation information may include already confirmed alternative schedule information, and the alternative schedule can be a schedule that has been confirmed, and be the same as any two of the cinema, movie, and time specified in the user preference, and here, the time being the same indicates, as described above, that the time to watch a movie falls within the time period specified in the user preference, or the difference between the time to watch a movie and the time point specified in the user preference is less than a predetermined threshold.

Subsequently, at step S312, the first electronic apparatus transmits the generated (i.e., confirmed) dynamic schedule to the respective second electronic apparatus. As described above, the dynamic schedule can be transmitted to the second electronic apparatus based on a request from the second electronic apparatus or periodically.

Finally, the operational flow ends at step S314.

It should be noted that the operational flow 300 of the first electronic apparatus according to the present disclosure is merely illustrative, and those skilled in the art can modify the operational flow according to actual situations. The order of the various steps can be adjusted as appropriate or performed in parallel, for example, the step of generating and transmitting recommendation information may be performed after the transmission of the dynamic schedule, or may be performed in parallel with the latter. Moreover, the operational flow 300 can also include other steps, for example, in the case of transmitting a dynamic schedule based on a request, steps of receiving the request and authenticating the second electronic apparatus can also be included.

The schematic structural configuration and schematic operational flow of an electronic apparatus for realizing dynamic scheduling for a cinema are described above with reference to the accompanying drawings. Next, an electronic apparatus that controls playing of a movie according to a dynamic schedule will be described with reference to FIGS. 4 and 5.

Figure 4:
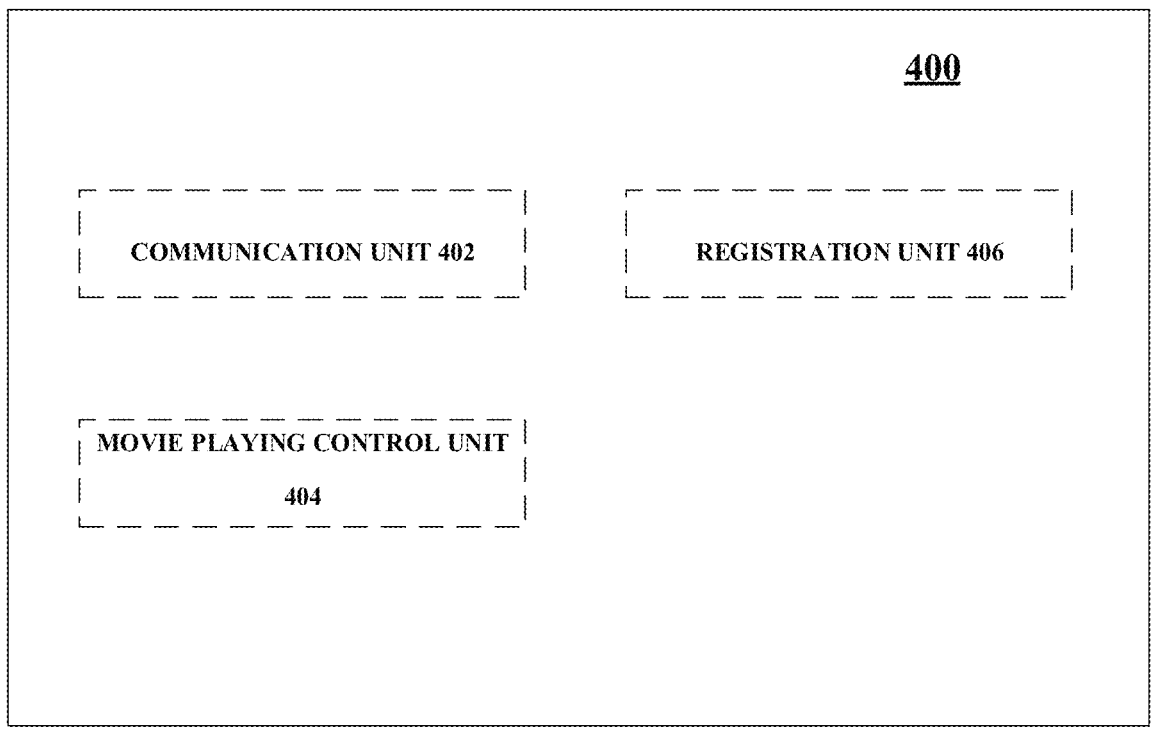
FIG. 4 is a schematic diagram of a structural configuration of an electronic apparatus that controls playing a movie in accordance with a dynamic schedule according to an embodiment of the present disclosure.

As shown in FIG. 4, an electronic apparatus 400 (hereinafter simply referred to as the second electronic apparatus 400) for controlling playing a movie according to a dynamic schedule is illustrated. As shown in FIG. 4, the second electronic apparatus 400 may include a communication unit 402, a movie playing control unit 404, and a registration unit 406. Although FIG. 4 illustrates the above three units, the second electronic apparatus 400 may further include other possible units, or a combination of units including any of the above three units.

The communication unit 402 is configured, for example, to receive a dynamic schedule from a first electronic apparatus. The dynamic schedule is generated according to one of a plurality of scheduling schemes based on a plurality of user preferences, wherein the user preference specifies at least a movie that the user desires to watch, a time for watching the movie, a cinema for watching the movie, and the number of people watching the movie. It is to be noted that the dynamic schedule received by the communication unit 402 may be a schedule only for the cinema corresponding to the second electronic apparatus, rather than for all cinemas in the cinema system. In this way, the amount of communication data can be reduced and the reception processing of the second electronic apparatus can be simplified. The user preference has been described in detail above with reference to the first electronic apparatus, and will not repeated here again. Additionally, as described above, the plurality of scheduling schemes may include, for example, a first scheme based on a number of movie-goers, a second scheme based on an amount of money, and a third scheme based on a type of consumption. The specific operations of how to select a scheduling scheme for a cinema and generate dynamic schedules according to these three schemes have been described in detail above, and will not repeated here again. Additionally, the dynamic schedule received by the communication unit 402 is a schedule that has been confirmed. Further, in the case that there is a scheduling conflict for different movies at the same time in the same cinema, the dynamic schedule received by the communication unit 402 is confirmed based on any one or more of: a time when the user provided the user preference, a user's identity and a turnover of playing the movie. The specific operations for resolving scheduling conflict to confirm the schedule have been described in detail above, and will not be repeated here again.

According to the present disclosure, the communication unit 402 can be configured to interpret data transmitted from the first electronic apparatus to receive a dynamic schedule in accordance with a predetermined protocol. For example, the communication unit 402 can process the received encapsulated data in accordance with rules specified in the predetermined protocol agreed between the first electronic apparatus and the second electronic apparatus, to decode the dynamic schedule data therefrom. For example, as described above, the rules may specify fields related to the dynamic schedule data and data content within the fields. The communication unit 402 can decode the data corresponding to various fields according to the rules, thus interpreting the dynamic schedule.

According to the present disclosure, the communication unit 402 can further be configured to decrypt the received data.

According to the present disclosure, the second electronic apparatus 400 may receive a dynamic schedule from the first electronic apparatus after registering with the first electronic apparatus. The communication unit 402 can communicate with the first electronic apparatus under the control of the registration unit 406 to register with the first electronic apparatus. For example, when the second electronic apparatus is first added to the cinema system according to the present disclosure, the second electronic apparatus can register with the first electronic apparatus. For example, the registration unit 406 of the second electronic apparatus generates identity information of the second electronic apparatus (such as the city, region where the cinema is located, and cinema name), and transmits the identity information to the first electronic apparatus for registration via the communication unit 402. The second electronic apparatus may receive a assigned unique identifier (e.g., an ID) of the second electronic apparatus from the first electronic apparatus in response to the registration result. Alternatively, the registration unit 406 may also control to set an identifier conforming to an identifier rule on the second electronic apparatus side and control to transmit the identifier set to the first electronic apparatus via the communication unit in response to a requirement of the first electronic apparatus. In this case, the registration unit 406 may generate an identifier by itself according to the identifier rule and display the generated identifier to the user of the second electronic apparatus, or the registration unit 406 may control to display the identifier rule on a display device (e.g., can be a display on the second electronic apparatus or a separate display connected to the second electronic apparatus) on the second electronic apparatus side to assist the user of the second electronic apparatus to input a identifier conforming to the rule to the second electronic apparatus. In addition, in the case that an identifier conforming to the identifier rule is set on the second electronic apparatus side, the registration unit 406 may, in response to the first electronic apparatus for the check result of whether the received identifier is duplicated with an existing identifier, and in the case of duplicating, perform control to reset the identifier.

According to the present disclosure, the second electronic apparatus 400 may authenticate to the first electronic apparatus via the communication unit 402 and request a dynamic schedule. The communication unit 402 can transmit the dynamic scheduling request for a specific time period corresponding to the cinema of the second electronic apparatus along with the identifier of the second electronic apparatus to the first electronic apparatus. As described above, the identifier may be used by the first electronic apparatus to detect whether it is matching with an identifier of any of a plurality of registered second electronic apparatus, and in the case that there is no matching identifier, the communication unit 402 can receive a notification of the authentication failure and the request being rejected from the first electronic apparatus. Further, to improve security, the authentication process may also include a challenge process known in the art, in which case the second electronic apparatus 400 may also calculate and send corresponding challenge response.

The dynamic scheduling request may include time period information corresponding to a dynamic schedule, for example, the request may include a request for a dynamic schedule for a certain day or may include a request for a dynamic schedule for a certain number of days. In particular, in the case that the time period information included in the transmitted dynamic scheduling request corresponds to elapsed time, or there is no dynamic schedule for the time period, the second electronic apparatus 400 may receive a notification from the first electronic apparatus to prompt that the request cannot be responded. Alternatively, the request may also not include any time period information, in which case the second electronic apparatus 400 receives, based on an agreement between the first electronic apparatus and the second electronic apparatus, the dynamic schedule within a specific time period for the cinema corresponding to the second electronic apparatus via the communication unit 402. For example, the specific time period may be the second day or a certain day following arbitrary number of days after the first electronic apparatus having received the request, or may be certain several days following arbitrary number of days after the first electronic apparatus having received the request. In other words, in a case that the request information does not include the time period information, the second electronic apparatus may, based on the agreement, via the communication unit, receive the dynamic schedule for the cinema corresponding to the second electronic apparatus for the second day or a certain day following arbitrary number of days or certain several days following arbitrary number of days after the first electronic apparatus having received the request. This approach can advantageously simplify the content of the request, thereby facilitating the corresponding processing by both electronic apparatus.

Dynamic scheduling requests can also be made for certain one or some specific movies. For example, the request transmitted by the second electronic apparatus to the first electronic apparatus may include particular one or more movie names and/or movie identifiers. In the case that the movie names and/or the movie identifiers included in the request are included in a known movie list, the second electronic apparatus may receive via the communication unit 402 only dynamic schedules related to the movie names and/or the movie identifiers. Similarly, such a request including movie names and/or movie identifiers may also include or not include time period information as described above.

According to the present disclosure, the communication unit 402 can also periodically receive dynamic schedule(s) from the first electronic apparatus. In this case, the second electronic apparatus can receive the dynamic schedule from the first electronic apparatus a few days or hours before the show time specified in the dynamic schedule confirmed by the first electronic apparatus, without sending any request about the dynamic schedule.

The movie playing control unit 404 can be configured to control playing a movie based on a received dynamic schedule. For example, the movie playing control unit can control a movie playing system to retrieve movie material corresponding to the movie specified in the dynamic schedule in accordance with the date and time specified in the received dynamic schedule and control the movie playing system to play the movie material in the designated hall. In particular, the movie material may be digital movie material. In this case, the movie playing control unit 404 may control the movie playing system to decrypt and decode the digital movie material at the designated date and time according to the dynamic schedule. It should be noted that the movie material can be stored locally in each cinema or stored remotely (for example, cloud storage). The movie playing control unit 404 can appropriately retrieve the desired movie material from the local storage or the remote storage according to the received dynamic schedule.

The structural configuration of a second electronic apparatus 400 according to the present disclosure has been described in detail above. A schematic operational flow 500 of an electronic apparatus that controls playing movies according to a dynamic schedule will be described with reference to FIG. 5 below according to an embodiment of the present disclosure.

Figure 5:
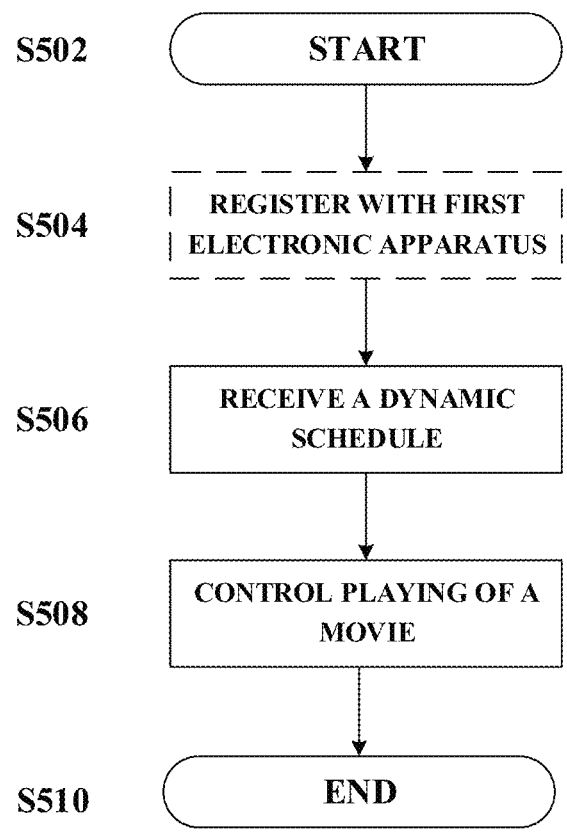
FIG. 5 is a flowchart of a schematic operational flow of an electronic apparatus that controls playing a movie in accordance with a dynamic schedule according to an embodiment of the present disclosure.

As shown in FIG. 5, the operational flow begins at step S502. At step S504, the second electronic apparatus registers with a first electronic apparatus. As described above, the registration may occur when the second electronic apparatus is first added to a cinema system in accordance with the present disclosure. For the second electronic apparatus that has been registered with the first electronic apparatus, the registration step can be omitted.

Subsequently, at step S506, the second electronic apparatus receives a dynamic schedule from the first electronic apparatus. As described above, the second electronic apparatus can authenticate to the first electronic apparatus and request a dynamic schedule so as to receive a dynamic schedule in response to the request if the authentication succeeds. Or, the second electronic apparatus can periodically receive dynamic schedules from the first electronic apparatus.

Next, at step S508, the second electronic apparatus controls playing of a movie based on the received dynamic schedule. As described above, the second electronic apparatus can control the movie playing system of the cinema corresponding to the second electronic apparatus to retrieve movie material corresponding to the movie specified in the dynamic schedule in accordance with the date and time specified in the received dynamic schedule, and control the movie playing system to play the movie material in the designated hall.

Finally, the operational flow ends at step S510.

A schematic interactive operational flow of a cinema system of an embodiment of the present disclosure will be described with reference to FIG. 6 below.

Figure 6:
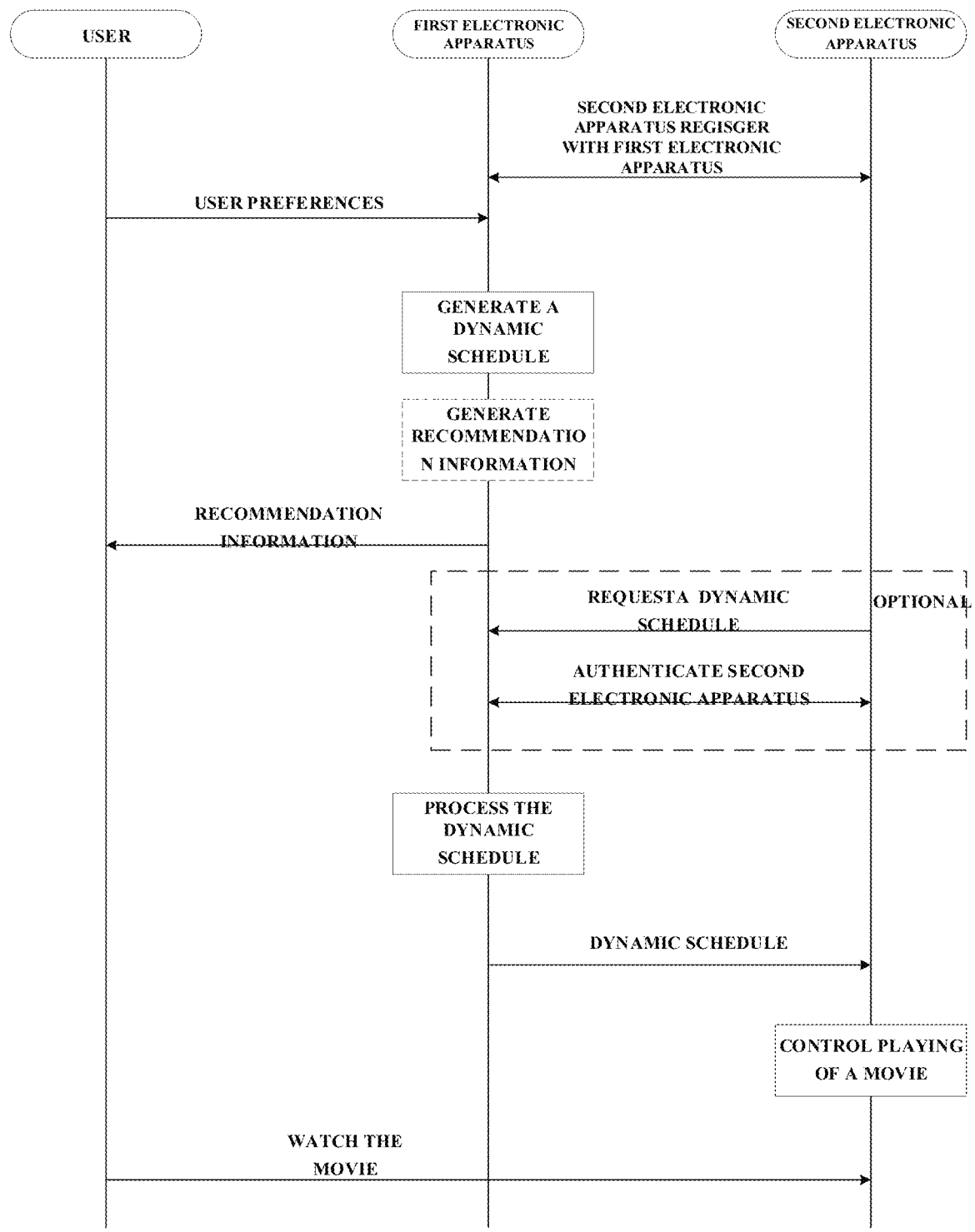
FIG. 6 illustrates a schematic interactive operational flow of a cinema system according to an embodiment of the present disclosure.

As shown in FIG. 6, in an initial configuration of a cinema system according to the present disclosure, a first electronic apparatus can communicate with one or more second electronic apparatus to cause each second electronic apparatus to register with the first electronic apparatus. As indicated above, the registration process may also occur when a new second electronic apparatus is added to the cinema system during operation of the cinema system. After, before or in parallel with the registration process, the first electronic apparatus may collect from users (i.e., the movie-goers) user preferences including the movies that users desire to watch, the time for watching the movies, the cinemas for watching the movies, and the number of people watching the movies and the like.

After collecting the user preferences, the first electronic apparatus may select one of a plurality of scheduling schemes for different cinemas according to their needs to generate a respective dynamic schedule for each cinema. As described above, the plurality of scheduling schemes may include, for example, a first scheme based on a number of movie-goers, a second scheme based on an amount of money, and a third scheme based on a type of consumption. In addition, although not shown in FIG. 6, in the case that there is a scheduling conflict for different movies at the same time in the same cinema, the first electronic apparatus may also confirm the schedule according to any one or more of the following: a time when the user provided the user preference, a user's identity and a turnover of playing the movie.

After respective dynamic schedule for each cinema is generated, the first electronic apparatus may process the dynamic schedule in accordance with a predetermined protocol, and transmit the processed dynamic schedule data to the second electronic apparatus (e.g., periodically) via an appropriate transmission layer protocol. The second electronic apparatus can receive the data transmitted from the first electronic apparatus, interpret the dynamic schedule in accordance with the predetermined protocol, and control playing of the movie in accordance with the interpreted dynamic schedule. Thus, the user is able to visit his or her desired cinema on desired date and time according to his or her preference to watch desired movie.

Referring to FIG. 6, the above schematic interactive operational flow may also include some optional steps. For example, in the case that schedules that satisfy certain user preferences cannot be confirmed, the first electronic apparatus may generate recommendation information based on these user preferences and the confirmed schedules, as described above, the recommendation information may include already confirmed alternative schedule information, and the alternative schedule can be a schedule that has been confirmed, satisfying any two of the cinema, movie, and time specified in the user preferences. In the case that the recommendation information is generated, the first electronic apparatus may transmit the recommendation information to a relevant user.

Additionally, the second electronic apparatus can request a dynamic schedule from the first electronic apparatus. In this case, the first electronic apparatus and the second electronic apparatus may also interact to enable the first electronic apparatus to authenticate the second electronic apparatus, and send the dynamic schedule to the second electronic apparatus only if the authentication succeeds.

A method and apparatus for realizing dynamic scheduling for a cinema, a method and apparatus for controlling playing a movie according to the dynamic schedule, and a cinema system have been described above with reference to the accompanying drawings according to embodiments of the present disclosure.

In the solution of the present disclosure, a cinema system can include a first electronic apparatus for realizing dynamic scheduling for a cinema and one or more second electronic apparatus for controlling playing a movie according to the dynamic schedule, and the plurality of second electronic apparatus can be in different regions. The first electronic apparatus can collect user preferences of the plurality of users and generate respective dynamic schedules for cinemas corresponding to the one or more second electronic apparatus simultaneously. Thereby, users do not need to go to a specific cinema to reserve a movie ticket, but instead send his or her preference to the first electronic apparatus in a collectively manner. Moreover, the schedule of each cinema can be dynamically generated according to user preferences, thereby providing better personalized movie watching services for users.

In the solution of the present disclosure, the first electronic apparatus collectively and automatically generates respective dynamic schedule(s) for one or more cinemas, thereby eliminating huge amount of manual labor, so that movie scheduling can be conducted more effectively.

In the solution of the present disclosure, the first electronic apparatus may select an appropriate scheme from multiple scheduling schemes based on the needs of each cinema to generate targeted dynamic schedule(s) respectively. This makes it possible to better balance user needs and commercial needs of the cinema for each cinema. In addition, each predetermined threshold in each scheduling scheme can also be flexibly set or dynamically adjusted to enable dynamic schedule(s) to be generated in time in response to changes in demand and/or actual situations.

Figure 7:
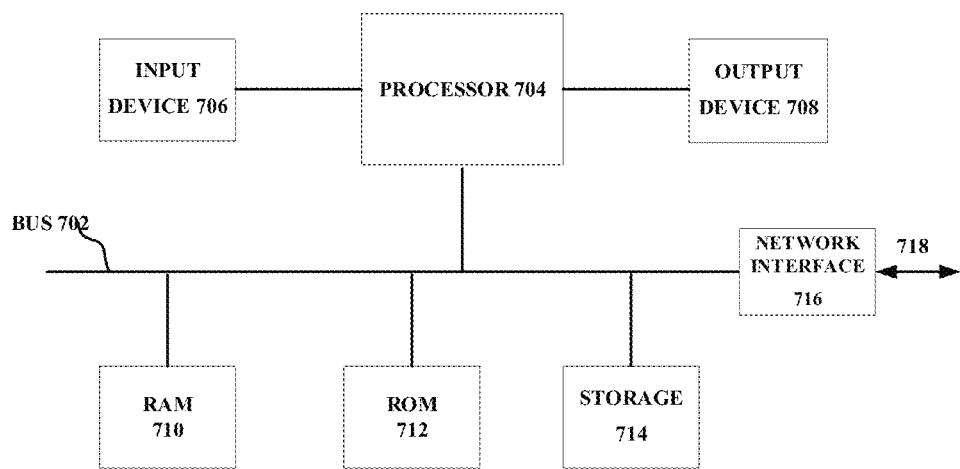
FIG. 7 is an exemplary configuration diagram of a computer device in which an embodiment according to the present disclosure can be implemented.

FIG. 7 illustrates an exemplary configuration in which the computing device 700 in accordance with an embodiment of the present disclosure may be implemented. The computing device 700 may be a instance for a first electronic apparatus for implementing dynamic scheduling for a cinema and one or more second electronic apparatus for controlling playing a movie according to the dynamic schedule, according to the present disclosure. The computing device 700 can be any machine configured to perform processing and/or computing. The computing device 700 can be, but is not limited to, a workstation, a server, a desktop computer, a laptop, a tablet, a personal data assistant (PDA), a smart phone, an onboard computer, or a combination of the above.

As shown in FIG. 7, the computing device 700 can include one or more elements that can be connected to or in communication with the bus 702 via one or more interfaces. The bus 702 can include, but is not limited to, an Industry Standard Architecture (ISA) bus, a Micro Channel Architecture (MCA) bus, an Enhanced ISA (EISA) bus, a Video Electronics Standards Association (VESA) local bus, and Peripheral Component Interconnect (PCI) bus, etc. The computing device 700 can include, for example, one or more processors 704, one or more input devices 706, and one or more output devices 708. The one or more processors 704 can be any kind of processor and can include, but is not limited to, one or more general purpose processors or special purpose processors (such as a dedicated processing chip). The input device 706 can be any type of input device capable of inputting information to a computing device, and can include, but is not limited to, a mouse, a keyboard, a touch screen, a microphone, and/or a remote controller. The output device 708 can be any type of device capable of presenting information and can include, but is not limited to, a display, a speaker, a video/audio output terminal, a vibrator, and/or a printer.

The computing device 700 can also include or be connected to the non-transitory storage 714, which can be any storage device that is non-transitory and can implement data storage, and can include, but is not limited to, a disk drive, an optical storage device, a solid state memory, a floppy disk, a flexible disk, a hard disk, a magnetic tape or any other magnetic medium, a compact disk or any other optical medium, a cache memory and/or any other memory chip or module, and/or any other medium that a computer can read data, instructions, and/or code therefrom. The computing device 700 can also include the random access memory (RAM) 710 and the read-only memory (ROM) 712. The ROM 712 can store programs, utilities, or processes to be executed in a non-volatile manner. The RAM 710 can provide volatile data storage and store instructions related to the operation of the computing device 700. The computing device 700 can also include the network/bus interface 716 that is coupled to the data link 718. The network/bus interface 716 can be any kind of device or system capable of enabling communication with external apparatus and/or networks, and can include, but is not limited to, a modem, a network card, an infrared communication device, a wireless communication device, and/or a chipset (such as a Bluetooth™ device, a 1302.11 device, a WiFi device, a WiMax device, a cellular communication facility, etc.).

It should be further understood that the elements of the computing device 700 can be distributed throughout the network. For example, other remote processors can be used to perform other processes while using one processor to perform some processes. Other elements of the computing device 700 may also be similarly distributed. Thus, the computing device 700 can be understood as a distributed computing system that performs processes at multiple locations.

The various aspects, embodiments, implementations, or features of the foregoing embodiments can be used individually or in any combination. Various aspects of the foregoing embodiments can be implemented by software, hardware, or a combination of hardware and software.

For example, the foregoing embodiments may be embodied as computer readable code on a computer readable medium. The computer readable medium is any data storage device that can store data, which can thereafter be read by a computer system. Examples of computer readable media include read-only memory, random access memory, CD-ROM, DVD, magnetic tape, hard disk drive, solid state drive, and optical data storage device. The computer readable medium can also be distributed in a network coupled computer system such that the computer readable code is stored and executed in a distributed manner.

For example, the foregoing embodiments may take the form of hardware circuits. The hardware circuit can include any combination of combined logic circuits, clock storage devices (such as floppy disks, flip-flops, latches, etc.), finite state machines, memories such as static random access memory or embedded dynamic random access memory, custom design circuits, programmable logic arrays, etc.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

While some specific embodiments of the present disclosure have been presented in detail by way of example, it should be understood by the skilled in the art that the above examples are intend to be illustrative only, not limiting the scope of the present disclosure. The above effects are merely illustrative effects, and the solutions of the present disclosure may have other technical effects as well. It should be appreciated that some steps of the foregoing methods are not necessarily performed in the order illustrated; instead they can be performed simultaneously, in a different order, or in an overlapping manner. Moreover, those skilled in the art can add some steps or omit some steps as needed. Some units in foregoing apparatus are not necessarily arranged as shown, and those skilled in the art may add some units or omit some units as needed. Those skilled in the art will understand that the foregoing embodiments may be modified without departing from the scope and essential of the disclosure. The scope of the disclosure is defined by the appended claims.

The invention claimed is:

1. A method for implementing a dynamic schedule for a cinema, the method comprising:
   receiving user preferences from a plurality of users, wherein a user preference of the user preferences is indicative of one or more of a movie that a user desires to watch, a time when the user desires to watch the movie, and a cinema where the user desires to watch the movie;
   determining a turnover of a first movie using the user preferences, wherein the turnover is based on playing the first movie in a first cinema at a first time, and a price of the first movie played at the first time at the first cinema;
   comparing the turnover of the first movie to a first threshold;
   if the turnover exceeds the first threshold, generating, a dynamic schedule for the first movie playing in the first cinema;
   determining a scheduling conflict for different movies at a same time in the first cinema; and
   generating the dynamic schedule based on one or more of a time when the plurality of users provided the user preferences and identities of the plurality of users.

2. The method of claim 1, further comprising obtaining pricing data corresponding to a plurality of movies played at a plurality of cinemas.

3. The method of claim 1, wherein the first time corresponds to a time period when different users desire to watch the first movie.

4. The method of claim 1, further comprising generating the dynamic schedule for the first movie for the first cinema at a designated time, the designated time based on the first time.

5. The method of claim 1, wherein the user preference further comprises a number of people in the user's party.

6. The method of claim 1, further comprising determining a number of users associated with playing the first movie at the first cinema at the first time, wherein determining the turnover is further based on the number of users.

7. The method of claim 1, wherein the user preference is further indicative of a type of consumption, and if the type of consumption for the user preference corresponds to block-booking, the dynamic schedule is generated based on the movie that the user desires to watch at the time the user desires to watch the movie and further at the cinema where the user desires to watch the movie.

8. The method of claim 1, wherein if the dynamic schedule does not correspond to the user preference of the user, the method further comprising:
generating recommendation information based on the user preferences; and
transmitting the recommendation information to the user, the recommendation information corresponding to one or previously generated dynamic schedules, the recommendation information comprising:
first alternative schedule information, comprising the time and the cinema specified in the user preference and a different movie from the movie that the user desires to watch specified in the user preference;
second alternative schedule information, the movie and the time specified in the user preference, and at a different cinema from the cinema where the user desires to watch the movie specified in the user preference; and
third alternative schedule information, comprising the movie and the cinema specified in the user preference, and different time from the time when the user desires to watch the movie specified in the user preference.

9. The method of claim 1, wherein the dynamic schedule is transmitted by a first electronic apparatus to a second electronic apparatus associated with the first cinema.

10. The method of claim 9, wherein transmitting the dynamic schedule comprises:
transmitting, to the second electronic apparatus, the dynamic schedule for a specific time period based on a request by the second electronic apparatus; or
transmitting periodically the dynamic schedule to the second electronic apparatus.

11. An electronic apparatus for generating a dynamic schedule for a cinema, the electronic apparatus comprising a memory having computer executable instructions stored thereon and a processor, the computer executable instructions, when executed by the processor, cause the apparatus to perform a method comprising:
receiving user preferences from a plurality of users, wherein a user preference of the user preferences is indicative of one or more of a movie that a user desires to watch, a time when the user desires to watch the movie, and a cinema where the user desires to watch the movie;
determining a turnover of a first movie using the user preferences, wherein the turnover is based on playing the first movie in a first cinema at a first time, and a price of the first movie played at the first time at the first cinema;
comparing the turnover of the first movie to a first threshold;
if the turnover exceeds the first threshold, generating, a dynamic schedule for the first movie playing in the first cinema;
determining a scheduling conflict for different movies at a same time in the first cinema; and
generating the dynamic schedule based on one or more of a time when the plurality of users provided the user preferences and identities of the plurality of users.

12. A method for controlling playing a movie according to a dynamic schedule, the method being performed by a second electronic apparatus, the method comprising the steps of:
receiving a dynamic schedule from a first electronic apparatus; and
controlling playing the movie based on the dynamic schedule,
wherein, the dynamic schedule is generated according to a method comprising:
receiving user preferences from a plurality of users, wherein a user preference of the user preferences is indicative of one or more of a movie that a user desires to watch, a time when the user desires to watch the movie, a cinema where the user desires to watch the movie, and a number of people in the user's party;
determining a turnover of a first movie using the user preferences, wherein the turnover is based on playing the first movie in a first cinema at a first time, and a price of the first movie played at the first time at the first cinema;
comparing the turnover of the first movie to a first threshold;
if the turnover exceeds the first threshold, generating, a dynamic schedule for the first movie playing in the first cinema;
determining a scheduling conflict for different movies at a same time in the first cinema; and
generating the dynamic schedule based on one or more of a time when the plurality of users provided the user preferences and identities of the plurality of users.

13. The method of claim 12, wherein the dynamic schedule is generated according to the method further comprising obtaining pricing data corresponding to a plurality of movies played at a plurality of cinemas.

14. The method of claim 12, wherein the first time corresponds to a time period when different users desire to watch the first movie.

15. The method of claim 12, wherein the dynamic schedule is generated according to the method further comprising generating the dynamic schedule for the first movie for the first cinema at a designated time, the designated time based on the first time.

16. The method of claim 12, wherein the dynamic schedule is generated according to the method further comprising determining a number of users associated with playing the first movie at the first cinema at the first time, wherein determining the turnover is further based on the number of users.

17. The method of claim 12, wherein the user preference is further indicative of a type of consumption, and
if the type of consumption for the user preference corresponds to block-booking, the dynamic schedule is generated based on the movie that the user desires to watch at the time the user desires to watch the movie and further at the cinema where the user desires to watch the movie.

* * * * *